United States Patent [19]
Johnson

[11] Patent Number: 4,764,065
[45] Date of Patent: Aug. 16, 1988

[54] WALL ANCHOR

[76] Inventor: Carl D. Johnson, 8773 Chase Dr., #201, Arvada, Colo. 80003

[21] Appl. No.: 47,189

[22] Filed: May 6, 1987

[51] Int. Cl.[4] .......................................... F16B 13/04
[52] U.S. Cl. ........................................ 411/21; 24/625; 403/297; 411/341; 411/342
[58] Field of Search ................. 411/21, 22, 340–342, 411/345; 292/43, 55; 24/625, 135 A, 136 B; 403/297

[56] References Cited

U.S. PATENT DOCUMENTS

| | | |
|---|---|---|
| 476,362 | 6/1892 | Breisch ........................ 411/21 X |
| 863,184 | 8/1907 | Jaquith . |
| 883,833 | 4/1908 | Rossi ............................ 411/21 X |
| 926,839 | 7/1909 | Argo ............................ 411/21 X |
| 972,853 | 10/1910 | Hambry et al. ............ 411/21 X |
| 1,102,485 | 7/1914 | Ehlert ............................. 411/21 |
| 1,162,266 | 11/1915 | Weiss ............................. 411/342 |
| 1,487,290 | 3/1924 | Tomkinson . |
| 2,192,484 | 3/1940 | Bryan ........................... 411/21 X |
| 2,376,329 | 5/1945 | DeCausse . |
| 3,269,251 | 8/1966 | Bass . |
| 3,312,138 | 4/1967 | Cumming ...................... 411/21 |
| 3,396,624 | 8/1968 | Eriksson et al. . |
| 3,552,258 | 1/1971 | Warner ......................... 411/21 |
| 4,116,104 | 9/1978 | Kennedy ..................... 411/342 X |
| 4,636,121 | 1/1987 | Miller .......................... 411/21 |

FOREIGN PATENT DOCUMENTS

| | | |
|---|---|---|
| 477801 | 10/1951 | Canada . |
| 853514 | 10/1952 | Fed. Rep. of Germany ........ 411/21 |
| 546920 | 9/1922 | France ............................ 292/55 |
| 1123325 | 6/1956 | France ............................ 411/345 |
| 1236439 | 6/1960 | France ............................ 411/21 |
| 0572594 | 9/1977 | U.S.S.R. ......................... 411/341 |

Primary Examiner—Lloyd A. Gall
Attorney, Agent, or Firm—Wm. Griffith Edwards

[57] ABSTRACT

An anchor for attaching cables or other devices to a wall structure comprises a hollow metal cylinder having a pair of wing members pivoted within the cylinder and extending through opposing openings in the sides of the cylinder. The wings are spring biased to their collapsed positions in the cylinder and are extended by the pressure of a bolt threaded in one end of the cylinder. The wings may be forced by the bolt to wedge the cylinder in a concrete or other solid wall, alternatively may be extended in back of a panel wall for retaining the anchor in place.

7 Claims, 3 Drawing Sheets

WALL ANCHOR

This invention relates to wall anchors for attaching objects to walls, and particularly to an improved anchor for securing objects to solid concrete walls and alternatively to wall panels.

BACKGROUND OF THE INVENTION

Many devices have been provided heretofore for attaching guy wires and other objects to solid walls and other structures. These include anchoring devices which, when passed through holes in wall panels, can be expanded or bent outwardly on the far side to prevent their withdrawal, and others which can be expanded outwardly against the walls of a hole drilled in concrete or the like to secure the anchor in place.

It is an object of this invention to provide an improved anchor for attaching guy wires and other objects to walls.

It is another object of the present invention to provide an anchor of the type which can be secured either in a hole drilled in a solid wall or in a hole drilled through a wall panel and which includes an improved arrangement for securing the device selectively to either type of wall structure.

SUMMARY OF THE DISCLOSURE

Briefly, the anchor disclosed herein includes a hollow cylindrical body open at one end and having two opposing openings in its middle portion. The other end is preferably closed. Two wing members extend through the opposed openings and are pivoted together centrally of the cylindrical member. The openings are formed with their ends sloping radially outwardly toward the other end of the cylinder to provide sloping faces against which collapsed wing members may rest. The wing members are biased toward their collapsed position against the sloping wall faces by a spring which is compressed between the other end of the cylinder and the pivoted connection of the wing members. When the wings are in their biased position against the sloping walls of the central openings the exterior of the anchor is substantially smooth and free of obstruction and does not project from the cylinder so that it may easily be inserted in a hole drilled in concrete, for example, which hole is of a size in which the anchor will fit closely. A bolt or screw member is threaded into the one end of the cylindrical member in a position such that it may be moved against the joint between the wing members and, on further movement, will move the members laterally outwardly of the cylinder into a position in which they can engage the far side of a panel when the cylinder is inserted through a hole in the panel. When the cylinder is inserted in a hole drilled in a solid wall, such as a concrete wall, the pressure exerted by the bolt threaded into the cylinder will urge the connected ends of the wing members toward the far end of the cylinder and the wings will be pressed along the sloping edge of the openings between the cylinder and the wall of the drilled hole. When the bolt is tightened into position this pressure is sufficient to retain the anchor in position in the wall. Thus two alternative positions and uses of the anchor are provided, the first use for panel walls being such that the wings are expanded laterally out beyond the cylinder on the inside of the wall where they prevent the withdrawal of the cylinder from the wall. When the wings are compressed against a solid wall they will hold the cylinder in place by pressure between the cylinder and the wall and thereby retain the anchor in position. The threaded bolt may be an eyebolt and thus provide for connecting a cable to the wall.

For better understanding of the invention and further objects and advantages thereof references may be had to the accompanying drawing illustrating a preferred embodiment of the invention.

DETAILED DESCRIPTION

The anchor of this invention has a cylindrical body which may be inserted in a hole of the same size drilled in a panel wall and also, alternatively, in a solid wall such as masonary or concrete. The anchor has a driving member such as a threaded bolt which may be removed after the anchor has been set, or may be used to attach a cable or other device to the wall, or it may be an eyebolt or be replaced by an eyebolt which may be screwed into place in the installed anchor body.

Figure 1:
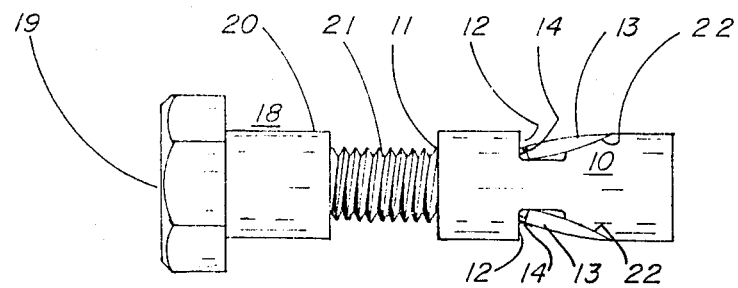
FIG. 1 is a side elevation view of an anchor embodying the invention.
Figure 2:
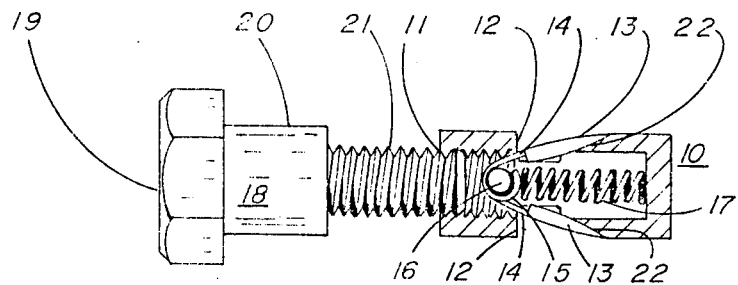
FIG. 2 is a partial sectional elevation view of the anchor of FIG. 1.
Figure 3:
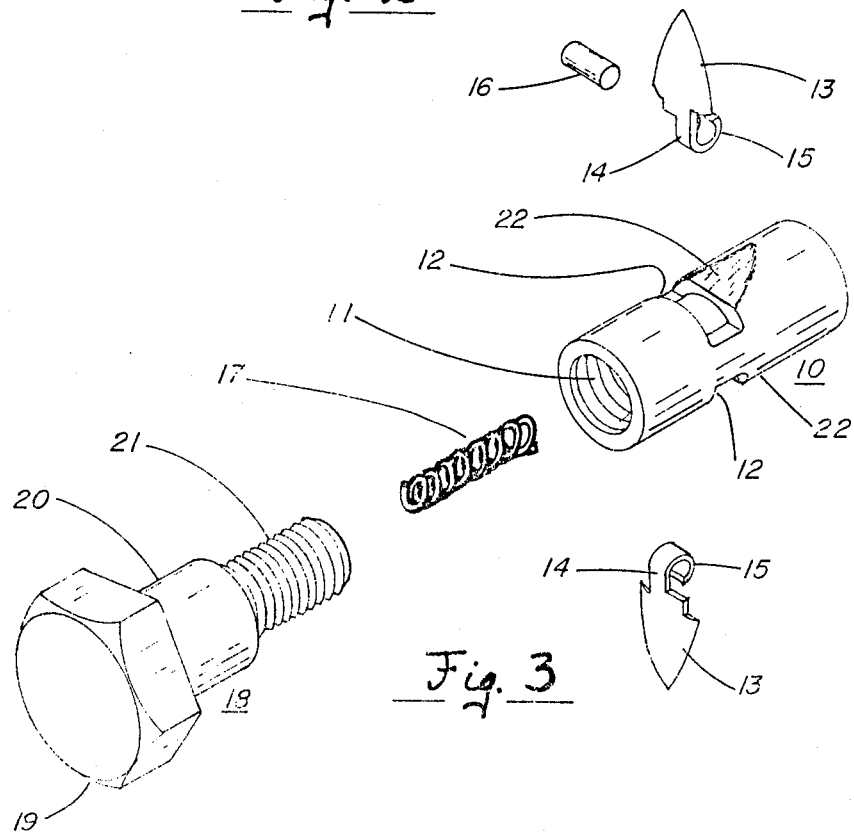
FIG. 3 is an exploded isometric view of the anchor of FIG. 1.

With reference to the drawings, the anchor illustrated in FIGS. 1 and 2 comprises a hollow cylindrical body 10 made of steel or other metal of sufficient strength. The body 10 has internal threads 11 in its near end as indicated in FIGS. 2 and 3 and has two opposed openings 12 in its central portion. A pair of pivotally moveable wings 13 are supported in the cylinder with the wings folded and positioned to extend through the openings 12. As shown in FIG. 3 the wings are provided with inner offset extensions 14 each having a bearing loop 15 arranged to be journalled on a short shaft 16. The size and configuration of the extensions 14 and bearings 15 are such that, for assembly, the wings are placed in the opposed openings with the bearings in axial alignment, and the shaft 16, which is held in one of the bearings, is then moved into the other bearing to provide the hinged connection. The shaft is of a size to fit snugly in the bearings so that it remains in place during normal handling of the anchor and after installation. As shown in FIG. 2, a biasing spring 17 is positioned between the closed end of the cylinder and the ends 15 of the extensions 14 which are held in pivoted relationship by the pin 16. This biases the pivoted joint of the wings toward the internal threads 11 and toward or against a bolt member 18 which is threaded into the threads 11 when the wings are to be moved. The bolt 18 has a hexagonal head 19 and a base portion 20 of the same diameter as the cylinder 10 and a threaded end 21 engaging the internal threads 11, the threaded end being arranged to engage and move the pivotal connection of the wings 13. It will also be noted that, when the spring 17 presses the wings 13 against the threads 11 at the opening 12, it presses the wings inwardly toward folded engagement with the sloping wall portions 22 at the opposite ends of the openings and thus biases the wings toward engagement with the sloping portions.

Figure 4:
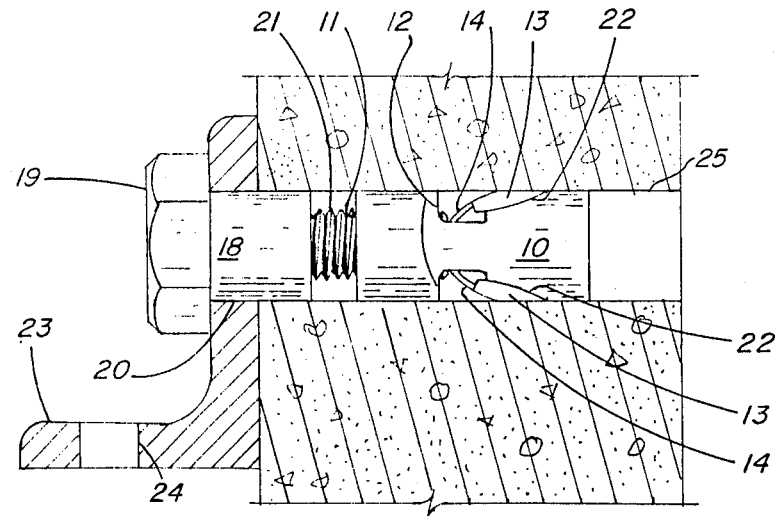
FIG. 4 is a view of the anchor of FIG. 1 installed in a concrete wall which is shown in section.
Figure 5:
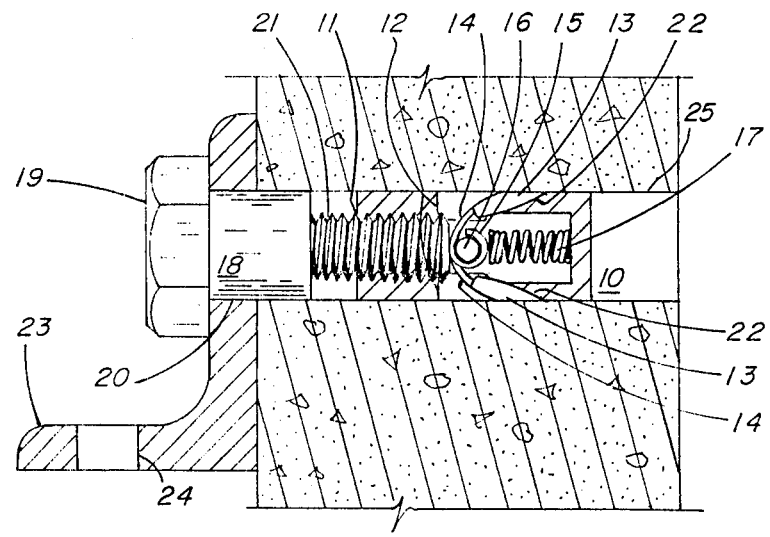
FIG. 5 is a view of the anchor as shown in FIG. 4 with the anchor shown partially in section.

When the anchor is to be installed in a solid wall such as concrete, a hole 25 is drilled in the concrete to closely fit and receive the cylinder 10. The wings 13 in their folded positions lie against the sloping wall portions 22 which extend outwardly and along the cylinder from the openings 12 toward the far end of the cylinder. In order to attach the cylinder to the wall, the bolt 18 is screwed into the cylinder and moves the pivotal connection of the wings 13 from the position of FIG. 2 toward the far end position shown in FIGS. 4 and 5; this presses the folded wings against and along the sloping surfaces 22 and thus outwardly against the wall of the hole 25. The edges of the wings are pointed in cross section, as indicated in FIGS. 2 and 4 and these are wedged into the spaces of wedge shaped cross section formed between the wall of the hole and the adjacent slopes 22 and under sufficient pressure may be driven somewhat into the surface of the wall. Thus the cylinder is wedged into place and held securely to provide an effective anchor.

The bolt head 19 is shown as tightened against an angle member 23 having a hole 24 for securing a cable or other device to the wall. The head 19 may also be an eyelet instead of the hex head indicated.

Figure 6:
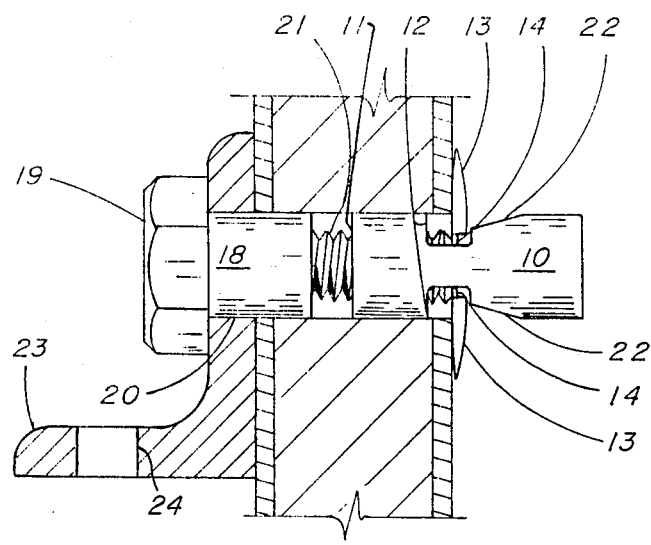
FIG. 6 is a side elevation view showing the anchor installed in a panel wall which is illustrated in section.
Figure 7:
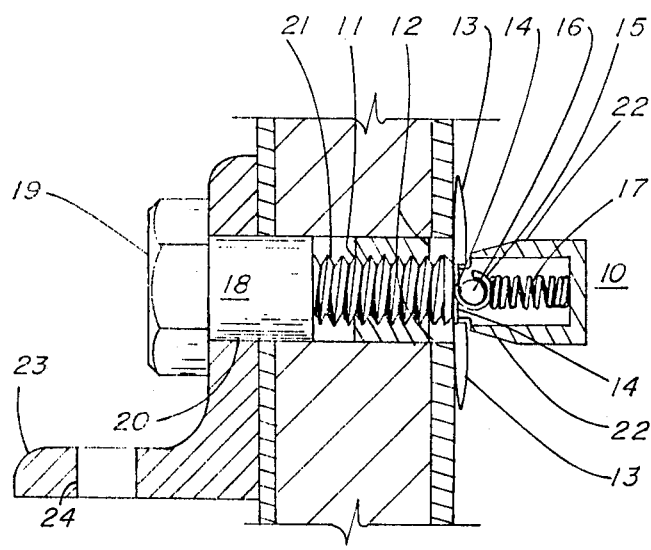
FIG. 7 is a view similar to that of FIG. 6 showing the anchor partially in section.

When the anchor is to be secured to a panel wall, a hole of the diameter of the cylinder is drilled in the panel to receive the cylinder as indicated in FIG. 6. The cylinder is inserted in the hole until the openings clear the wall, and the bolt 19 is then turned to press the wing pivots toward the far end, whereupon the wings rotate outwardly until they engage the rear surface of the panel as shown in FIG. 7, and prevent removal of the cylinder from the hole. Thus the anchor is secured in the wall and a cable or other device may be secured to the bolt, which if desired may be an eyebolt for this purpose.

After the anchor cylinder has been installed in a wall it is held securely in position until the bolt 18 is released and allows the wings 13 to return to their original folded positions under the pressure of the biasing spring 17. The anchor may thus serve either as a permanent or a temporary attaching means and may be removed easily when desired.

The wings are made of steel or other metal having sufficient strength to secure the cylinder in the wall and retain it in position to carry the load of the cable or other device attached to it.

From the foregoing it will be apparent that this invention provides an anchor which may be attached securely to either a solid wall or a panel wall; and further that the anchor may be removed when desired and is then again ready for use. When the anchor is secured on a panel wall the hole in the wall may be drilled to provide a tight fit of the anchor cylinder and thereby minimize the likelihood that with the bolt removed the anchor will be pushed through the hole and lost behind the panel.

While the invention has been described in connection with a specific embodiment, other applications and modifications will occur to those skilled in the art. Therefore, it is not desired that the invention be limited to the details illustrated and described and it is intended, by the accompanying claims, to cover all modifications which fall within the spirit and scope of the invention.

I claim:

1. An anchor for securing objects alternatively to panel or to solid walls comprising a hollow cylindrical member having internal threads near one end, said member having a pair of oppositely disposed openings in its side wall, a pair of wing members extending outwardly through respective ones of said openings and movably secured together at their inner ends within said cylindrical member and foldable against said cylindrical member in the direction toward the end remote from said threads, means biasing the inner ends of said wing members toward said one end and the outer ends of said wing members toward said remote end, a drive member threaded in said threads for movement toward and away from said inner ends of said wing members, said drive member engaging said inner ends for moving said ends against said biasing means for urging the outer ends of said wings laterally outwardly whereby said wings may be selectively extended on the inner side of a wall panel to prevent withdrawal of said cylindrical member or may be driven between said cylindrical member and a solid wall when inserted in a hole therein closely fitting said cylindrical member to retain it in position in said solid wall.

2. The invention set forth in claim 1 wherein said threads are located between said one end and said openings.

3. The invention set forth in claim 1 wherein said wing members are hinged together at their inner ends.

4. The invention set forth in claim 3 wherein the hinge connection of said wing members is detachable whereby said wing members may be removed from said cylindrical member.

5. The invention set forth in claim 1 wherein the side walls of said member adjacent said openings slope axially and outwardly toward said remote end and provide spaces of wedge shaped cross section formed between said cylindrical member and a wall in which said cylindrical member is inserted whereby said wing members when forced outwardly are wedged between the wall and said cylindrical member and secure said member in the wall.

6. An anchor as set forth in claim 1 or claim 3 wherein said biasing means is a helical spring positioned in said cylindrical member for exerting pressure between said cylindrical member near said remote end and said inner ends of said wing members.

7. An anchor as set forth in claim 6 wherein said cylindrical member is closed at said remote end.

* * * * *